MAGNETIC SYSTEMS

Filed Feb. 29, 1956 4 Sheets-Sheet 1

INVENTOR.
HEWITT D. CRANE
BY Morris B. Rabkin
ATTORNEY

Sept. 9, 1958 H. D. CRANE 2,851,678

MAGNETIC SYSTEMS

Filed Feb. 29, 1956 4 Sheets-Sheet 2

INVENTOR.
HEWITT D. CRANE

BY Morris A. Rabkin

ATTORNEY

INVENTOR.
HEWITT D. CRANE
BY Morris A. Rabkin
ATTORNEY

Sept. 9, 1958 H. D. CRANE 2,851,678

MAGNETIC SYSTEMS

Filed Feb. 29, 1956 4 Sheets-Sheet 4

INVENTOR.
HEWITT D. CRANE
BY Morris A. Rabkin
ATTORNEY 2,851,678
Patented Sept. 9, 1958

2,851,678

MAGNETIC SYSTEMS

Hewitt D. Crane, Princeton, N. J., assignor to Radio Corporation of America, a corporation of Delaware Application February 29, 1956, Serial No. 568,569
17 Claims. (Cl. 340—174)

This invention relates to magnetic systems, and particularly to improved magnetic switching or decoding systems.

Certain of the magnetic switching or decoding systems of the prior art are arranged to provide an output from at least a selected one of a plurality of magnetic elements in accordance with a set of selecting currents applied to the magnetic elements. These selecting currents may be concurrent, at least in part, and may be of uniform amplitude. Some examples of magnetic switching or decoding systems are described in an article published by Jan A. Rajchman, in vol XIII of the RCA Review, June 1952.

In certain of these prior-art systems, a plurality of current sources are used to effect selection of the magnetic elements. Because a plurality of sources are used, problems arise in obtaining this suitable set of selecting currents.

It is among the objects of the present invention to provide an improved magnetic switching system wherein a single selecting current source, rather than a set of current sources, is used to select a desired magnetic element.

Another object of the present invention is to provide improved magnetic switching systems which eliminate the above-mentioned problems of obtaining a suitable set of selecting currents.

According to the invention, a plurality of magnetic elements, each having two remanent states, are linked in a desired combinatorial code by a plurality of sets of current paths, each set being connected in series with the other and each set including means for steering a current through at least one of its paths to effect selection of one or more of the elements. Each different path includes a different control device which may be operated selectively to prevent or to permit the steered current flow in the path.

Input signals are applied to the control devices to enable at least one control device in each set of current paths. In some embodiments of the invention, the steered current then flows serially through those paths that include the enabled control devices; in other embodiments of the invention the steered current flows only in the paths which do not include the enabled control devices.

An advantage of the present invention is that the plurality of control devices such as tubes, heretofore used for selecting magnetic elements of certain prior-art systems, may be replaced by a plurality of magnetic cores and diode rectifiers.

The invention will be better understood from the following description when read in connection with the accompanying drawing wherein.

Figures 1, 2:
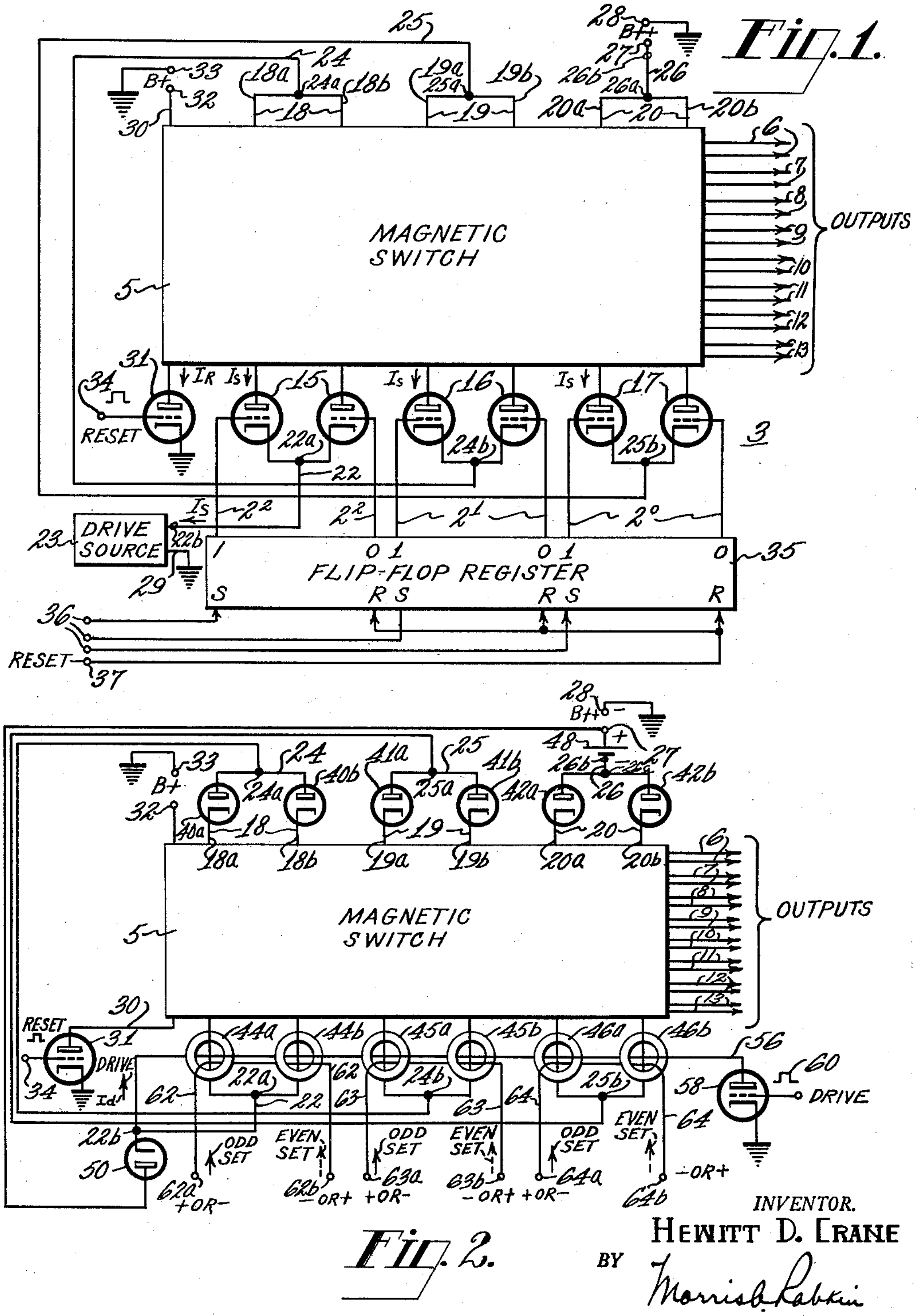
Fig. 1 is a schematic diagram of a magnetic system embodying the invention and using, in each current path, an electronic tube as a control device.
Fig. 2 is a schematic diagram of another magnetic system embodying the invention and using the combination of a magnetic core and a diode rectifier in each current path as a control device.

In Fig. 1, a magnetic switching system 3 has a magnetic switch 5 illustratively having three binary inputs $2^0$–$2^2$ and eight output channels 6–13. A binary coded system is described for purposes of explanation. Other known code arrangements, such as trinary, may be used within the scope of the invention. Each separate combination of the binary inputs $2^0$–$2^2$ operates to select a corresponding output channel 6–13. The switch 5 may be arranged similarly to the one described in Fig. 3 of the above-mentioned Rajchman article. The correspondence will be apparent to those skilled in the art. Each binary input is used to enable one vacuum tube of each pair of the three pairs of vacuum tubes 15–17. The binary input 111 to the switch 5 may be used to select the topmost core of the switch 5 for furnishing an output on the topmost channel 6 and the binary input 000 to the switch 5 may be used to select the lowermost core of the switch 5 for furnishing an output on the lowermost channel 13. Three sets of current paths are linked in combinatorial fashion to the cores of the switch 5. The three sets of current paths may be, for example, the three pairs of switching windings 18–20. The three pairs of switching windings 18–20 correspond respectively to the three pairs of input windings described in Fig. 3 of the Rajchman article aforesaid.

The switching windings of a pair are connected in parallel with one another and the three pairs are connected the one to another in a series circuit.

Each different one of the switching windings 18–20 is connected at one end to the anode of a different one of the vacuum tubes 15–17. The other ends of the three pairs of switching windings 18–20 are connected in parallel to the three terminals **24*a*, 25*a* and 26*a* of the three conductors 24, 25 and 26. The cathodes of the three pairs of vacuum tubes are connected in parallel to the three terminals 22*a*, 24*b* and 25*b*, respectively, of the conductors 22, 24 and 25. The other terminal 22*b* of the conductor 22 is connected to one output of a drive source 23. The other terminal 26*b* of the conductor 26 is connected to the positive terminal 27 of a supply source B++ which has its negative terminal 28 connected to a common conductor, indicated in the drawing by the conventional ground symbol. The other output lead 29 of the drive source 23 is also connected to the common ground. A reset winding 30 is linked to each core of the switch 5 in a manner similar to restore winding, described in Fig. 3 of the above-mentioned Rajchman article. The reset winding 30 has one end connected to the anode of a reset vacuum tube 31 and the other end connected to the positive terminal 32 of a supply source B+. The other negative terminal 33 of the source B+ is connected to the common ground. The source B+ may be the same as the source B++. The cathode of the reset tube 31 is also connected to the common ground. The grid of the reset tube 31 is connected to a reset terminal 34. Each of the tubes 15–17 and the reset tube 31** is normally biased to cut-off.

The $2^0$–$2^2$ binary inputs of the switch 5 may be supplied by the "1" and the "0" binary outputs of a three-stage flip-flop register 35. The "1" and the "0" outputs of each different flip-flop of the register 35 are connected respectively to the control grids of the one and the other vacuum tubes of each different pair of tubes 15–17. The register 35 may have three set inputs "S" for receiving three individual input signals and three reset inputs "R" for receiving a common reset signal. The input signals corresponding to the orders designated $2^0$–$2^2$ may be applied at three input terminals 36. The common reset signal may be applied to a reset terminal 37 connected to each of the reset terminals "R" of the register 35. When a flip-flop of the register 35 is set, its "1" output is high relative to its "0" output and when reset, its "0" output is high relative to its "1" output. The inputs at terminals 36 and 37 to the system may be supplied by any suitable device, for example a digital computer. The eight output channels 6–13 of the switch 5 may be used to supply any suitable utilization device (not shown) which is responsive to signals supplied on the respective output channels. Other current-controlling devices, such as transistors, may be used for the vacuum tubes, and other known storage registers may be used for the flip-flop register 35.

In operation, each of the cores of the switch 5 are in one remanent state, for example the state "N." The flip-flops may be initially reset. A combination of $2^0$–$2^2$ input signals at the input terminals 36 set corresponding flip-flops of the register 35. The "1" outputs of the set flip-flops and the "0" outputs of the reset flip-flops each enable a corresponding one of the control tubes in each of the three pairs 15–17 of tubes. Operation of the drive source 23 then causes current $I_S$, which is the steered current (assumed to flow in the conventional direction), in one current path of each of the three pairs of current paths 18–20. The current $I_S$ in the three current paths generates magnetizing forces which are additive in one of the switch cores, thereby driving the one switch core to the opposite remanent state P. The one driven switch core furnishes an output to the corresponding one of the output channels 6–13.

For example, the binary number 111 may set each of the register 35 flip-flops, thereby enabling each of the left-hand (as viewed in the drawing) tubes of the three pairs 15–17. The current $I_S$, produced when the drive source 23 is operated, then flows in series through the paths **20*a*, 19*a*, and 18*a* of the three pairs of current paths. The topmost core of the switch 5 may be the one selected core and an output of one polarity is furnished on the first output channel 6. Activation of the reset tube 31 then produces a reset current $I_R$ which returns the topmost core back to the remanent state N, thereby resetting the switch 5 for further operation and, at the same time, producing an opposite polarity pulse on the output channel 6. Either or both polarity pulses on channel 6 may be useful. After the desired output is obtained, the flip-flops of the register 35 may be reset to their initial reset condition by applying a signal to the reset input 37**.

The amplitude, rise and fall times, and duration of the current $I_S$, are effectively controlled by the single drive source 23. Accordingly, in the system of Fig. 1, problems of regulating a plurality of switching currents are substantially eliminated. Also problems of tube-ageing and tube-drift are greatly simplified because the tubes are used only as steering devices to steer a single selecting current, generated elsewhere, through at least one selected current path in each of the sets of current paths. The grids of the pairs of control tubes 15–17 are, however, operated at different D. C. (direct current) levels because of the series arrangement of the tube pairs. For example, to obtain full conduction of an enabled tube, a different level of D. C. bias is used for the grids of the $2^2$ pair 15 than for the grids of either of the $2^1$ or $2^0$ pairs 16 and 17.

The control tubes of the system of Fig. 1 can be replaced by magnetic cores and diode rectifiers, as shown in Fig. 2. A separate one of the diode rectifiers 40–42 and a separate one of the magnetic cores 44–46 are connected in each of the separate current paths of the pairs 18–20. A D. C. bias source, illustrated by the battery 48, has its positive terminal connected to the positive terminal 27 of the $B^{++}$ source, and its negative terminal connected to the terminal **26*b* of the conductor 26. The terminal 22*b* of the conductor 22 is connected to the cathode of a switching diode rectifier 50 which has its anode connected to the positive terminal 27 of the $B^{++}$ source. The respective diode rectifiers 40*a*–42*a* and 40*b*–42*b* in each current path are poled for easy conventional current flow from the negative terminal of the bias battery 48 towards the cathode of the switching diode 50. The current paths 18*a*–20*a* and 18*b*–20*b* are linked to each core of the pairs of cores 44–46 and has one end connected to the cathode of the switching diode 50 and its other end connected to the anode of a drive tube 58. The cathode of the drive tube 58 is connected to the common ground. The drive tube 58 is connected to receive a drive pulse 60 applied to its control electrode. Each pair of the three pairs of cores 44*a* and 44*b* to 46*a* and 46*b* is linked by a different one of three setting coils 62–64. The setting coils 62–64** have terminals designated *a* and *b*. Beginning at their *a* terminals, each setting coil is linked through one core, the *a* core, of each different pair of cores **44*a* and 44*b* to 46*a* and 46*b***, and is linked through the other core, the *b* core, of each different pair. The reset winding 30 is connected in the system, as described for the reset winding 30 of Fig. 1. The sense of linkage of the respective windings to the cores 44–46 is described hereinafter.

Each of the cores of the pairs 44–46 may be initially magnetized in one remanent state, say N. The drive coil 56 links each of the cores 44–46 in a direction such that a drive current (conventional) in the direction of the arrow $I_d$ drives, or tends to drive, each of the cores 44–46 to the state N.

A combination of input signals may be separately applied to the setting coils 62–64 so as to make one or the other of the respective *a* and *b* terminals of each of the coils 62–64 positive relative to the other terminal of the same coil. The two polarities of current flowing in any one of the coils 62–64 may be termed respectively "odd" and "even." When an *a* terminal of a setting coil 62–64 is made positive relative to the *b* terminal of that coil, an odd set current flows in the direction of the solid arrow and one core, the *a* core, of the linked pair is driven from one state, say N, to the other state P, and the *b* core of the linked pair is driven further into saturation in the state N. When the *b* terminal of a setting coil is made positive relative to the *a* terminal of that coil, an even set current flows in the direction of the dotted arrow and the *b* core of the linked pair is driven from the state N to the state P, and the *a* core of the linked pair is driven further into saturation in the state N. Thus, each combination of binary signals sets one or the other of the cores in each pair of cores 44–46 to the state P.

In operation, assume that each of the cores 44–46 is in the N remanent state. Application of a drive pulse 60 to the drive tube 58 causes the drive current $I_d$ to flow. The drive current $I_d$ flows from the $B^{++}$ source through the switching diode 50, through the drive coil 56 and the drive tube 58, back to the $B^{++}$ source. Substantially all of the drive current is bypassed from the current paths 18–20 by the switching diode 50. Thus, none of the cores of the switch 5 is driven to the state P and no output is produced by the switch 5. Any noise voltages produced when the cores 44–46 are driven further into saturation in the state N are insufficient to overcome the bias voltage of the battery 48 and each of the diodes 40–42 remains nonconductive, thereby preventing the drive current $I_d$ from flowing in any of the current paths 18–20.

Assume now that a combination of binary inputs are applied to the setting coils 62–64. The binary inputs may be separate "odd" setting currents which operate to drive the left-hand core in each pair from the state N to the state P. The setting current sources may operate from the same or different voltage levels. The voltages induced in the current paths 18*a*, 19*a*, and 20*a*, linked to the set cores 44*a*, 45*a*, and 46*a*, by the flux changes in these set cores, do not produce any loop currents in the pairs of current paths 18–20 because each pair of diodes 40*a*,*b*–42*a*,*b* is connected back-to-back. Thus, for this reason, and for the further reason that the drive tube 58 is open when the setting currents are applied, substantially no current flows in the current paths 18–20 during the setting operation.

Application of a drive pulse 60 to the control electrode of the drive tube 58 causes the drive current $I_d$ to flow in the drive coil 56 in the direction of the arrow $I_d$. The drive current $I_d$ drives each left-hand core of the pairs 44–46 from the state P back to the state N. When the left-hand cores of the pairs are driven from the state P to the state N, a voltage is induced in each of the left-hand current paths 18*a*, 19*a*, and 20*a*. These induced voltages are in a direction to drive the diodes 40*a*, 41*a*, and 42*a* of the left-hand paths 18*a*, 19*a*, and 20*a* to a conductive condition. The induced voltages are also in a direction to bias the diodes 40*b*, 41*b*, and 42*b* of the other current paths 18*b*, 19*b*, and 20*b* into cut-off. The induced voltages in the left-hand current paths are additive toward the cathode of the switching diode 50 and these additive voltages operate to bias the switching diode 50 to cut-off. Therefore, the drive current $I_d$ is switched through the series circuit including the left-hand current path in each of the pairs 18–20.

The drive current $I_d$ flowing in the left-hand current path in each of the pairs 18–20 generates magnetizing forces in the switch cores of the switch 5. A selected one of the switch cores of the switch 5 is driven by these forces from the state N to the state P, thereby furnishing an output on its output channel. After termination of the drive current, a reset current returns the selected switch core back to its initial state N, thereby furnishing an opposite polarity output on the one output channel connected to the selected switch core.

Figure 3:
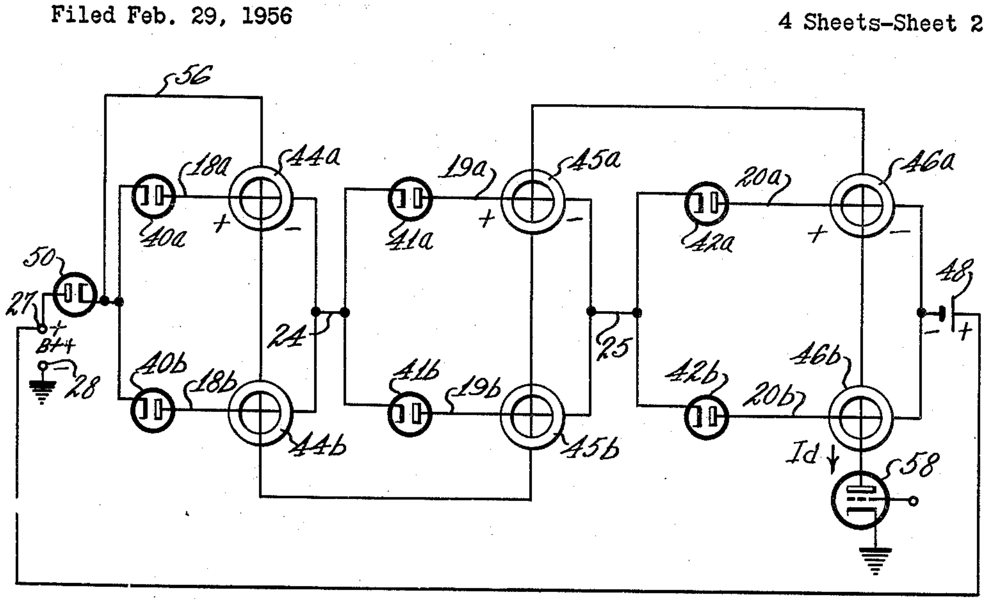
Fig. 3 is a schematic diagram of a portion of the system of Fig. 2 illustrated in somewhat different fashion and useful in explaining the operation of the system of Fig. 2.

The advantages of the arrangement of the system of Fig. 2 will be more fully apparent from a consideration of the simplified circuit of Fig. 3. In Fig. 3, for purposes of explanation, only the drive coil 56 and the current path 18*a* to 20*a* and 18*b* to 20*b* are shown. The bias battery 48 maintains each of the diodes 40–42 in a non-conductive condition. Assume, for the moment, that each of the cores 44*a*, 44*b* to 46*a*, 46*b* is in the state N. Operation of the drive tube 58 causes a drive current $I_d$ to flow in the drive coil 56. A noise voltage is induced in each of the switch windings by the drive current $I_d$. The noise voltages are of a polarity to bias the respective diodes to conduction. However, the bias battery 48 is selected to have a sufficiently large voltage such that the diodes remain biased to cut-off and substantially no current is caused to flow in the current paths as a result of these noise voltages.

Assume, now, that alternate control cores 44*a*–46*a* are set as by applying odd set currents in the direction of the solid arrows to the setting coils 62–64 (Fig. 2). The setting currents operate to change the upper three cores of Fig. 3 from the state N to the state P. The voltages induced in the switch windings 18*a*, 19*a*, and 20*a*, linked to the set control cores 44*a*, 45*a* and 46*a*, are in a direction to bias the diodes 40*a*, 41*a* and 42*a*, further into cut-off.

Application of a drive current $I_d$ now switches the three upper control cores back to the state N. The voltages induced in the three switch windings 18*a*–20*a*, during the switching of the three cores 44*a*–46*a*, are in a direction to bias the three diodes 40*a*–42*a* toward conduction and to bias the diodes 40*b*–42*b* and the switching diode 50 to non-conduction; that is, the cathodes of these diodes are made positive relative to their anodes. Accordingly, the drive current $I_d$ flows from the $B^{++}$ source through the battery 48 and through the current paths 18*a*, 19*a* and 20*a*, and through the drive coil 56 and the drive tube 58 back to the $B^{++}$ source. Substantially no current flows in the current paths 18*b*, 19*b* and 20*b* because the voltages developed by the switched cores 44*a*–46*a* are sufficient to maintain the diodes 40*b*–42*b* cut-off and to supply any additional voltage which may be required to supply a load device connected in the output channel of any selected switch core. Thus, even though the control cores 44*b*–46*b* are driven further into saturation in the N state, their associated diodes remain cut-off and no unwanted currents flow in the paths 18*b*–20*b*. After the three control cores 44*a*–46*a* are switched to the N state, the drive current $I_d$ again returns through the switching diode 50, the drive coil 56, and the drive tube 58 back to the $B^{++}$ source, when the voltages induced in the respective switch windings become less than that of the bias voltage of the bias battery 48. The number of turns of the drive coil 56, linked to the respective control cores 44–46, is made larger than the number of turns of the windings of the current paths 18–20 in order to completely switch the drive current. Thus, for a drive current $I_d$ the net magnetizing force $Xm$ acting on the respective cores 44*a*–46*a* is:

$$Xm = I_d(Nd - Ns) \quad (1)$$

where $Nd$ and $Ns$ are respectively the number of turns of the drive coil 56 and the windings of the paths 18*a*–20*a*, and $Nd > Ns$.

Note that the cores 44*a*, 44*b*—46*a*, 46*b* do not need to be uniform in size or characteristics. Essentially all that is required of a core is that it provide sufficient voltage to make the diode of its current path conductive for at least a minimum time required to select the desired core, or cores, of the switch 5. If a driven core produces a larger voltage than that required to make the diode of its current path conducting, it merely means that the switching diode 50 and the diode connected in the other current path of the pair, including this driven core, are driven further into their cut-off region. The setting currents may be applied at any time prior to the drive current and may be concurrent or non-concurrent with each other, as desired.

Figure 4:
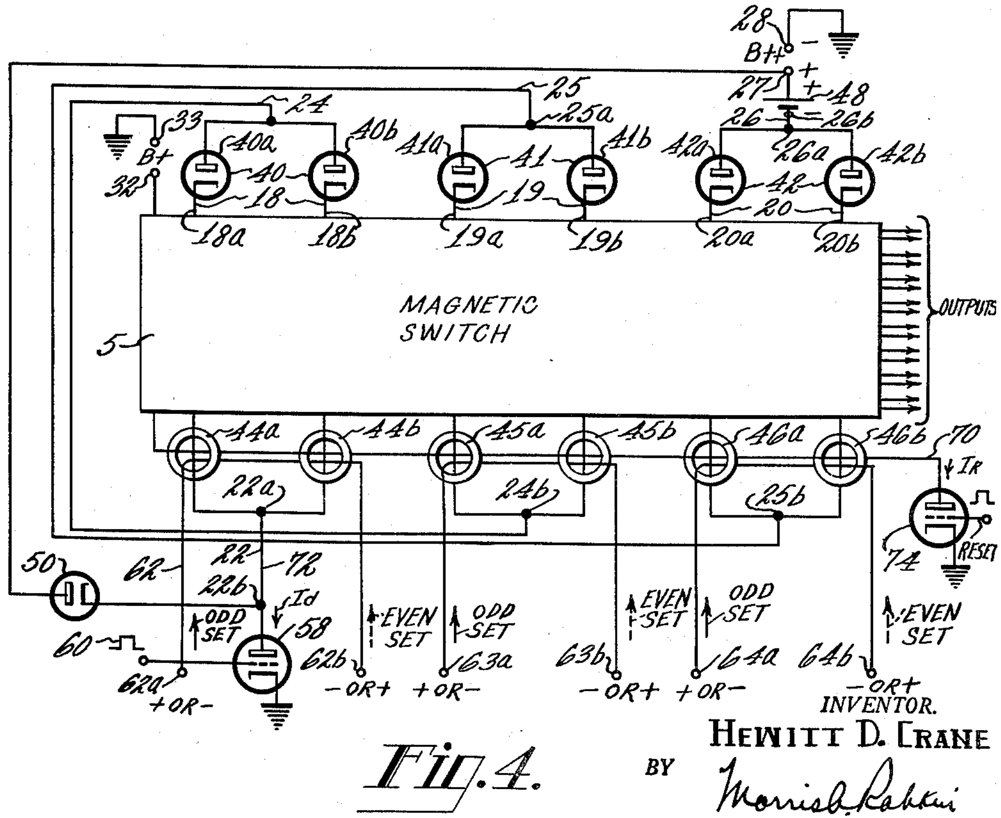
Fig. 4 is a schematic diagram of still another magnetic system embodying the invention and employing a different arrangement for driving the system elements.
Figure 5:
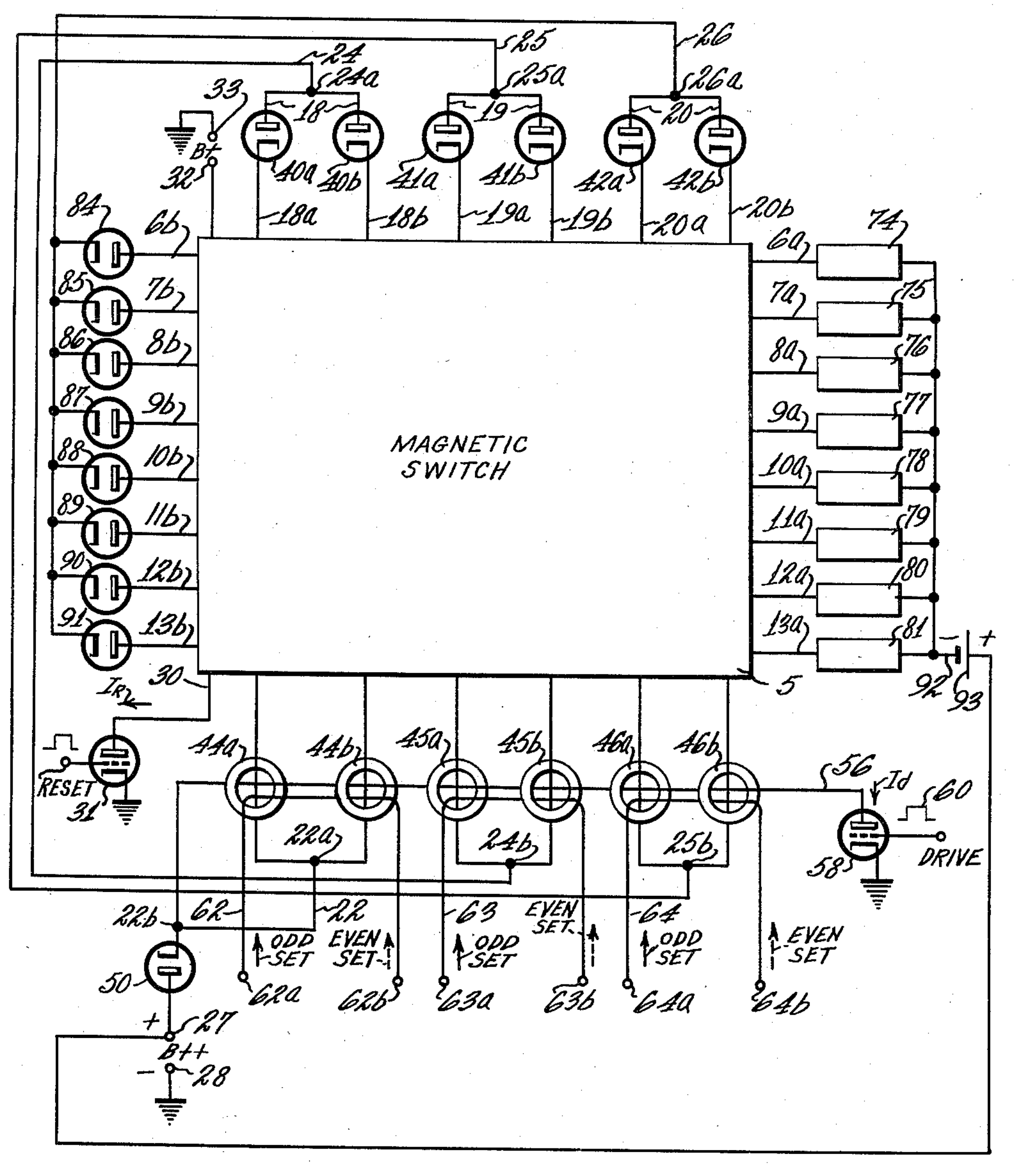
Fig. 5 is a schematic drawing of a magnetic system embodying the invention and including means for steering a current through a selected load device.

In the exemplary embodiments of Fig. 2 and the embodiments of Figs. 4 and 5, the switching diode 50 and the bias battery 48 (or 93 in Fig. 5) provide improved operating characteristics in that the duration of the drive current $I_d$ need not be closely regulated. However, neither the switching diode 50 nor the battery 48 is essential to the system operation and both may be removed by disconnecting the switching diode 50 from the terminals 22*b* and 27 and by directly connecting the terminal 26*b* to the terminal 27 in the circuits of Figs. 2 and 4; in the case of Fig. 5, by disconnecting the diode 50 and directly connecting the conductor 92 to the positive terminal 27 of the $B^{++}$ source. The systems are then arranged to terminate the drive current $I_d$ at the time when the set ones of the cores 44–46 are essentially switched back to the N state. Also, the switching diode 50 may be used alone and the bias battery 50 (or 93 in Fig. 5) short-circuited, for example, by directly connecting the terminal 26*b* to the terminal 27 (or directly connecting the conductor 92 to the terminal 27 in Fig. 5). In such case, essentially all the drive current $I_d$ is bypassed from the current paths 18–20 except when the set ones of the cores 44–46 are being switched back to the N state.

The invention may be arranged to steer a separate current different from the drive current $I_d$ through the paths 18–20. In such case, the drive coil 56 is disconnected from the terminal 22*b* and is connected to the terminal 27. The separate current source (not shown) is connected in series with the terminal 22*a*. The drive current and the separate steered current are made to be concurrent (at least in part). The drive current $I_d$ then serves as an interrogation current to return the set ones of the cores 44–46 to the N state and thereby to steer the separate current through those of the paths 18–20 that are linked to the set ones of the cores 44–46.

In certain systems, by omitting the switching diode 50 and the bias battery 48 (or 93 in Fig. 5) the same drive current $I_d$ can be used to automatically reset any driven one of the cores of the switch 5. This automatic reset is obtainedby arranging for the drive current to be continued after the set ones of the cores 44–46 have been returned to the N state. For example, if the duration of the drive current $I_d$ is longer than the time required to switch the previously set ones of the cores 44–46, the drive current $I_d$ divides equally between the two paths of each pair of the current paths 18–20 after the previously set cores are switched and a current $$\frac{I_d}{2}$$

then flows in each path. These currents $$\frac{I_d}{2}$$

are additive in the previously driven one of cores of the switch 5 in a direction to return the driven core back to the N state. In certain systems this may be desirable and, in such case, a reset means is not required.

Substantially no currents flow in the paths 18–20 during the setting operation even when the switching diode 50 and the bias battery 48 are not included in the system arrangement. As explained above, current flow is prevented during the setting operation because of the back-to-back connection of the pairs of diodes 40*a*, *b*, 42*a*, *b*, and because the drive tube 58 is then open-circuited.

An embodiment of the invention, wherein the setting and drive currents are applied concurrently, is shown in Fig. 4. The system of Fig. 4 is similar to that of Fig. 3 except that a reset coil 70 is linked to each of the control cores of the pairs 44–46 and to each of the switch cores of the switch 5, and that the switching diode 50 and the anode of the drive tube 58 are connected to the first pair of current paths 18 by a conductor 72. One end of the reset coil 70 is connected to the anode of a reset tube 74 and the other end of the reset coil 70 is connected to the positive terminal 32 of the B+ source. The negative terminal 33 of the B+ source and the cathode of the reset tube 74 are each connected to the common ground.

Each of the cores *44a, 44b—46a, 46b* is normally in a reset condition, for example the state N. Operation of the drive tube 58 alone, when the cores 44–46 are reset, does not produce any appreciable current flow in the current paths because the bias battery 48 maintains each of the diodes 40–42 cut-off. Application of a combination of setting currents alone to the setting windings 62–64 also does not produce any appreciable current flow in any of the current paths 18–20 because the drive tube 58 is open during the setting operation and the voltages induced in the current paths linked to the set core are in a direction to cut off the switching diode 50. Application of a combination of setting currents and a drive current at the same time, however, does produce a switching current in one switch winding in each of the switch winding pairs 18–20. In the latter case the setting currents are respectively additive with, and subtractive from, the drive current in the respective cores of each pair of control cores. Accordingly, only one core in each pair is driven from the state N to the state P. Again, the voltages induced in the current paths of the driven cores are additive in a direction to cut off the switching diode 50, and the diodes in the other current paths which include the other non-driven ones of the cores 44–46. The drive current $I_d$ then flows in one current path of each pair to effect selection of the one switch core of the switch 5 which corresponds to the combination of setting signals. The one switch core furnishes an output on its output channel. After the desired output is obtained, the reset tube 74 is operated to produce the reset current $I_R$. The reset current then resets each of the driven cores of the cores 44–46 from the state P back to the state N. The reset current $I_R$ also resets the selected switch core of the switch 5 to the state N. The selected switch core then furnishes another output on its output channel. The respective diodes 40–42, connected in the respective current paths 18–20, prevent current flow in the switch winding pairs during the reset operation.

The system of the present invention may be extended to provide uniform amplitude output currents in the different output channels. Also the waveshape of the output current may be varied, as described hereinafter, by providing another source for this output current. This extension involves steering a drive current through the switch cores and then steering an output current, which may be the same drive current, through the selected one of the output channels. For example, in the arrangement shown for the system of Fig. 5, the drive current $I_d$ is made to flow in the conventional direction through a selected one of the load devices 74–81 connected in the respective output channels 6–13. In the system of Fig. 5, a different one of the diodes 84–91 is connected in a different one of the output channels 6–13 each of which includes a different load device 74–81. A conductor 92 connects one terminal of each of the load devices 74–81 to the negative terminal of a bias battery 93. The positive terminal of the bias battery 93 is connected to the positive terminal 27 of the $B^{++}$ source which has its terminal 28 connected to the common ground. The bias battery 93 serves to bias each of the output channel diodes 84–91 and each of the diodes 40–42 connected in the current paths 18–20 to cut-off. If desired, instead of the single diode 50 and battery 93 combination that serves to bypass the drive current around both the current paths 18–20 and the load devices 94–81, a separate diode and battery combination (not shown) may be used for bypassing the drive current from the paths 18–20 and another separate diode and battery combination (not shown) may be used for bypassing the drive current from the loads 74–81. In such case, the battery 93 is short-circuited and the anode of the diode 50 is disconnected from the terminal 27 and connected in with a battery (not shown) to the terminal 26*b* of the conductor 26 to provide the one diode and battery combination; and a second diode and battery is connected in series between the terminal 26*b* of the conductor 26 and the load devices 74–81 at their common connection to provide the other diode and battery combination.

An output current of desired characteristics may be steered through a selected one of the load devices by disconnecting the conductor 26 from the channel diodes 84–91 and connecting its terminal 26*b* to the common connection of the load devices 74–81, and by connecting another current source (not shown) in series with the channel diodes 84–91. This other current source (not shown) is operated concurrently, at least in part, with the drive current $I_d$ to provide the desired output current in the selected load device 74–81 while the selected one of the switch cores of the switch 5 is being driven by the drive current $I_d$. In such case, the drive current is bypassed from the load devices 74–81 and returns to the $B^{++}$ source via the conductor 26 and the battery 93.

In operation, the one or the other of the control cores in each of the pairs 44–46 is placed in its set condition, the state P for example. The drive current $I_d$ then flows in one current path in each of the pairs 18–20. A selected one switch core, corresponding to the set of binary inputs, is thereby driven from the state N to the state P by the magnetizing forces produced by the drive current in the one current path of each pair. When the selected switch core is thus driven, the one of the channel diodes 84–91 associated with the selected switch core is made conductive, and the drive current $I_d$ is steered through one current path in each of the pairs 18–20, then through this one channel diode, then through its connected load, and then through the battery 93 back to the $B^{++}$ source. During reset, the channel diodes 84–91 prevent any substantial current flow in the output channels 6–13.

Each of the load devices 74–81 may be, for example, a switching winding of a larger magnetic switch. Thus, in a switching pyramid the same drive current could be used for selecting one switch core in a succession of tiers. For the illustrated arrangement of Fig. 5, the load devices 74–81 each has preferably a relatively low impedance such that the load voltage is equal to, or less than, the voltage generated by one of the switch cores over the interval when it is switching from one state to the other.

Figure 6:
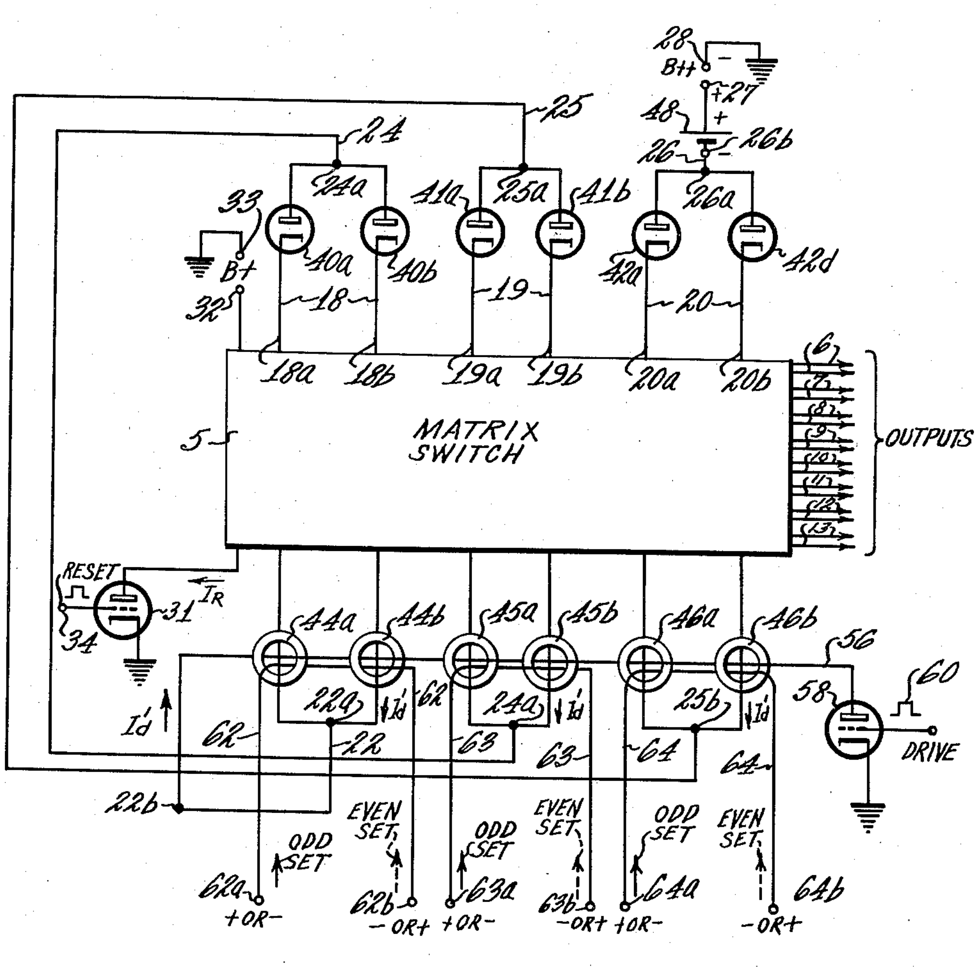
Fig. 6 is a schematic diagram of another magnetic system embodying the invention which uses another manner of linking the current paths to the cores.

In the embodiment of Fig. 6, a drive current $I_d'$ is steered through the current paths linked to those of the cores 44–46 which were not initially set by setting currents. During the drive operation, the current paths linked to the initially set cores have voltages induced which are in a direction to drive the diodes of these current paths to cut-off. Observe that these induced voltages are of the opposite polarity from corresponding voltages induced during the drive operation in the previously described embodiments. The opposite polarity-induced voltages are obtained by reversing the sense of linkage of the current paths 18–20 to the cores 44–46. Thus, referring for example to Fig. 2, the individual current paths 18–20, beginning at the cathodes of the respective diodes 40–42, link the individual cores 44–46 in one sense. Referring now to the embodiment of Fig. 6, the individual current paths 18–20, beginning at the cathodes of the diodes 40–42, link the individual cores 44–46 in the sense opposite the one sense. The sense of linkages of the drive coil 56 and the setting coils 62–64 to the individual cores 44–46 is the same for both the embodiments of Figs. 2 and 6. No switching diode 50 and bias battery 48 are used in the embodiment of Fig. 6.

Consider, now, the operation of the embodiment of Fig. 6. Assume that each of the left-hand cores **44*a*–46*a* of the pairs 44–46 is set by an appropriate combination of setting signals. No current flows during the setting operation because of the back-to-back connection of the diodes of each pair of current paths and because the drive tube 58 is open. During a subsequent drive operation, the drive current $I_d'$ changes each of the set cores 44*a*–46*a* back to the N remanent state. The voltage induced in the current paths 18*a*–20*a* by the flux changes in the cores 44*a*–44*b* is in a direction to bias each of the diodes 40*a*–42*a* to cut-off. Accordingly, the drive current $I_d'$ flows in the series circuit through each right-hand current path 18*b*–20*b*. The magnetizing forces, due to the drive current $I_d'$ in the paths 18*b*–20*b*, switch at least one of the cores of the switch 5 to the P remanent state, and at least one of the output channels 6–13 receives an output signal. The drive current $I_d'$ is terminated after the cores 44*a*–46*a* are essentially returned to the N remanent state. Observe, however, that the drive current $I_d'$ does not have to supply any additional mmf. for each driven one of the cores 44*a*–46*a*, as is the case for the system of Fig. 2. Note that substantially no current flows in the paths 18*a*–20*a* during the drive operation. Accordingly, the net mmf. acting on the respective cores 44*a*–46*a*** is:

$$X_m' = I_d' Nd \qquad (2)$$

where N*d* is the number of turns of the drive coil 56.

Comparing Equation 2 with Equation 1 above, it is seen that, for the same number of turns N*d*, the drive current $I_d'$ can be made much smaller, say two or more times smaller, than the drive current $I_d$ required for the system of Fig. 2. Furthermore, the voltage swing of the drive source is substantially the same in both the embodiments of Figs. 2 and 6 because an equal number of cores are changed back to their initial state by the drive current. Therefore, in a system wherein each set of current paths includes only a pair of current paths, advantages may be achieved by linking the current paths to the cores in the manner described for the system of Fig. 6. However, in the general case where each set has a number $n$ of current paths ($n>2$) in each of the K sets ($K\geqq1$), an embodiment arranged in the manner described for Fig. 6 requires a drive source capable of furnishing a larger voltage swing than is required in the previous embodiments. The larger voltage swing is necessary because, during the setting operation, $(n-1)$ of the cores are set in each of the K sets of current paths. The drive source then must return the K $(n-1)$ set cores back to their initial remanent states. Thus, the total voltage swing is equal to K $(n-1)$ times the voltage drop across any one of the driven cores, if the driven cores are to be completely switched back to their initial remanent state. In the prior embodiments, only one core in each of the K sets of current paths is changed from its initial remanent state during the setting operation. Accordingly, the drive source need return only the one set core in each set of paths back to the initial state, and the total voltage swing is equal to only K times the voltage drop across one of the driven cores.

In any particular system, the current and voltage capabilities of the available drive source may determine which of the arrangements of the invention is used.

During the reset operation, the driven cores of the switch 5 are returned to their initial remanent condition. Again, no current flows in any of the current paths 18–20 for the reasons described above in connection with the previous embodiments.

In certain systems the driven switch may be automatically returned to the N remanent state by allowing the drive current $I_d'$ to remain on for a longer time interval to cause a current $$\frac{I_d'}{2}$$

In these certain systems, the reset source 31, the reset winding, and the $B^+$ source may be dispensed with.

There has been described herein improved magnetic switching and decoding systems wherein a single selecting current is steered through at least one current path in a plurality of sets of current paths linked to a plurality of magnetic elements. In the systems using magnetic cores and diode rectifiers, substantially no unwanted current flows in the unselected current paths. Known compensation schemes for eliminating output signals from switch cores which are driven further into saturation in the N state by the selecting currents, may be employed in conjunction with the system of the invention. For example, each switch core may be paired with another core of linear magnetization characteristics where the output winding is linked in series opposition to the cores of a pair. In such case the output produced by driving the switch core of a pair further into saturation is effectively cancelled by the opposite-polarity output produced by the linear core of the pair.

What is claimed is:

1. A magnetic system having a plurality of magnetic elements each having two remanent states linked in a desired combinatorial fashion by pairs of current paths, each pair in a parallel circuit, a separate normally cut-off electronic device connected in each current path, said parallel circuits being connected in a series circuit, and means for steering a current applied to said series circuit through a desired one current path only in each of said pairs, said means including means for biasing a desired one of said electronic devices in each of said pairs of current paths to a conductive condition.

2. A magnetic system comprising a plurality of magnetic elements each having two remanent states, a plurality of sets of current paths linked to certain of said elements, each said set including a plurality of current paths, said current paths of a set being in parallel with each other and said sets of current paths being connected to each other in a series circuit, a separate magnetic core and a separate rectifier element connected in each of said paths, each of said magnetic cores having two remanent states, means for changing certain of said cores from one remanent state to the other remanent state, and means for applying a current to said series circuit, said current being steered through one or more but less than all of said current paths in each of said sets due to voltages induced in the current paths of said certain cores when the states of said certain cores are being changed.

3. A magnetic system comprising a plurality of magnetic elements each having two remanent states, a plurality of sets of current paths linked to certain of said elements in a desired combinatorial fashion, each said set including a plurality of current paths, said current paths of a set being in parallel with one another and said sets of current paths being connected the one to another in a series circuit, and means for steering a single selecting current applied to said series circuit through at least a selected one of said current paths in each of said sets of current paths.

4. A magnetic system comprising a plurality of magnetic elements each having two remanent states, a series circuit including a plurality of sets of parallel current paths linked to said elements in a desired combinatorial fashion, each said set including a plurality of current paths, a plurality of control devices a different one in each of said paths, each of said devices being operable to permit a current flow in its path in response to a setting signal, and means for applying selectively setting signals to one or more but less than all of said control devices in each of said sets of paths.

5. A magnetic system comprising a plurality of magnetic elements each having two remanent states, a series circuit including a plurality of sets of parallel current paths linked to said elements in a desired combinatorial fashion, each said set including a plurality of current paths, a plurality of control devices a different one in each of said paths for controlling current flow in said paths, and means for selectively operating said control devices to steer a current applied to said series circuit through less than all the current paths in each of said sets to effect selection of said elements.

6. A magnetic system having a plurality of magnetic elements each having two remanent states, a series circuit including a plurality of sets of parallel current paths linked to said elements in a desired combinatorial fashion, each said set including a plurality of current paths, and means for steering a current applied to said series circuit through at least a desired one current path in each of said sets, said means comprising electronic control devices each having conductive and non-conductive conditions, a different one of said devices in each of said paths, and means for selecting one or more but less than all of said control devices of each set of current paths to be in a conductive condition and the remainder to be in a non-conductive condition.

7. A magnetic system comprising a plurality of magnetic elements each having two remanent states, a plurality of sets of current paths linked to certain of said elements in a desired combinatorial fashion, each said set including a plurality of current paths, said current paths of a set being in parallel with each other and said sets of current paths being connected to each other in a series circuit, a separate magnetic core and a separate rectifier element connected in each of said paths, each of said magnetic cores having two remanent states, means for changing certain ones of said magnetic cores from an initial remanent state to the other remanent state, means for applying a magnetizing force to said magnetic cores in a direction to change each of said magnetic cores to its initial remanent state, and means for applying a current to said series circuit, said current being steered through one or more but less than all of said paths in each of said sets due to voltages induced in the paths of said certain cores when said certain cores are being changed from said other to said initial state.

8. A magnetic system comprising a plurality of magnetic elements each having two remanent states, a plurality of sets of current paths linked to certain of said elements in a desired combinatorial fashion, each said set including a plurality of current paths, said current paths of a set being in parallel with each other and said sets of current paths being connected to each other in a series circuit, a separate magnetic core and a separate rectifier element connected in each of said paths, each of said magnetic cores having two remanent states, means for changing certain ones of said magnetic cores from an initial remanent state to the other remanent state, and means for applying a magnetizing force to said magnetic cores in a direction to change each of said magnetic cores to its initial remanent state, and means for applying a current to said series circuit, said applied current being concurrent at least in part with the applied magnetizing forces, said current being steered through one or more but less than all of said current paths in each of said sets due to voltages induced in the current paths of said certain cores during the changing of said certain cores from said other to said initial state.

9. A magnetic system comprising a plurality of magnetic elements each having two remanent states, a plurality of sets of current paths linked to certain of said elements in a desired combinatorial fashion, each said set including a plurality of current paths, said current paths of a set being connected in parallel with each other and said sets of current paths being connected to each other in a series circuit, a separate magnetic core and a separate rectifier element connected in each of said paths, each of said magnetic cores having two remanent states, means for changing certain ones of said magnetic cores from one remanent state to the other remanent state, and means for applying a current to said series circuit, said current being steered through the paths of said certain cores due to voltages induced in the paths of said certain cores when the states of said certain cores are being changed.

10. A magnetic system comprising a plurality of magnetic elements each having two remanent states, a plurality of sets of current paths linked to certain of said elements in a desired combinatorial fashion, each said set including a plurality of current paths, said current paths of a set being connected in parallel with each other and said sets of current paths being connected to each other in a series circuit, a separate magnetic core and a separate rectifier element connected in each of said paths, each of said magnetic cores having two remanent states, means for changing certain ones of said magnetic cores from one remanent state to the other remanent state, and means for applying a current to said series circuit, said current being steered through the paths of the remaining ones of said cores due to voltages induced in the paths of said certain cores when the states of said certain cores are being changed.

11. A magnetic system comprising a plurality of magnetic elements each having two remanent states, a plurality of sets of current paths linked to certain of said elements, each said set including a plurality of current paths, said current paths of a set being in parallel with each other and said sets of current paths being connected to each other in a series circuit, a rectifier element connected across said series circuit, a separate magnetic core and a separate rectifier element connected in each of said paths, each of said magnetic cores having two remanent states, means for changing certain of said cores from one remanent state to the other remanent state, and means for applying a current to said series circuit, said current being steered through one or more but less than all of said current paths in each of said sets due to voltages induced in the current paths of said certain cores when the states of said certain cores are being changed.

12. A magnetic system comprising a plurality of magnetic elements each having two remanent states, a plurality of sets of current paths linked to certain of said elements, each said set including a plurality of current paths, said current paths of a set being in parallel with each other and said sets of current paths being connected to each other in a series circuit, a rectifier element connected across said series circuit, a separate magnetic core and a separate rectifier element connected in each of said paths, each of said magnetic cores having two remanent states, bias means connected in said circuit in a direction to bias said first-mentioned rectifier element towards a conductive condition and each of said separate rectifier elements towards a non-conductive condition, means for changing certain of said cores from one remanent state to the other remanent state, and means for applying a current to said series circuit, said current being steered through one or more but less than all of said current paths in each of said sets due to voltages induced in the current paths of said certain cores when the states of said certain cores are being changed.

13. A magnetic system comprising a plurality of magnetic elements each having two remanent states, a plurality of sets of current paths linked to certain of said elements in a desired combinatorial fashion, each said set including a plurality of current paths, said current paths of a set being in parallel with one another and said sets of current paths being connected the one to another in a series circuit, a plurality of output paths, separate ones of said output paths being linked to separate ones of said magnetic elements, a plurality of rectifier elements, separate ones of said rectifier elements being connected in series in separate ones of said output paths, said series circuit being connected in parallel to each of said output paths, and means for steering a single selecting current applied to said series circuit through at least a selected one of said current paths in each of said sets of current paths and through at least one of said output paths.

14. A magnetic system comprising a plurality of magnetic elements, each of said elements having two remanent states, a plurality of sets of current paths linked to certain of said elements, each said set including a plurality of current paths, said current paths of a set being in parallel with each other and said sets of current paths being connected to each other in a series circuit, a separate magnetic core and a separate rectifier element connected in each of said paths, each of said magnetic cores having two remanent states, means for changing certain of said cores from one remanent state to the other remanent state, and means for applying a current to said series circuit, said current being steered through one or more less than but all of said current paths in each of said sets due to voltages induced in the current paths of said certain cores when the states of said certain cores are being changed, said applied current initially changing one of said magnetic elements from one remanent state to the other when said certain cores are being changed and said current returning said changed element back to said one remanent state after said certain cores are changed.

15. A magnetic system comprising a plurality of magnetic elements, each of said elements having two remanent states, a plurality of sets of current paths linked to certain of said elements in a desired combinatorial fashion, each said set including a plurality of current paths, said current paths of a set being in parallel with each other and said sets of current paths being connected to each other in a series circuit, a separate magnetic core and a separate rectifier element connected in each of said paths, each of said magnetic cores having two remanent states, means for changing certain ones of said magnetic cores from an initial remanent state to the other remanent state, means for applying a magnetizing force to said magnetic cores in a direction to change each of said magnetic cores to its initial remanent state, and means for applying a current to said series circuit, said current being steered through one or more but less than all of said paths in each of said sets due to voltages induced in the paths of said certain cores when said certain cores are being changed from said other to said initial state, said applied current initially changing one of said magnetic elements from one remanent state to the other when said certain cores are being changed and said current returning said changed element back to said one remanent state after said certain cores are changed to their initial remanent states.

16. A magnetic system comprising a plurality of magnetic elements each having two remanent states, a plurality of sets of current paths linked to certain of said elements in a desired combinatorial fashion, each said set including a plurality of current paths, said current paths of a set being in parallel with each other and said sets of current paths being connected to each other in a series circuit, a separate magnetic core and a separate rectifier element connected in each of said paths, each of said magnetic cores having two remanent states, means for changing certain ones of said magnetic cores from an initial remanent state to the other remanent state, means for applying a magnetizing force to said magnetic cores in a direction to change each of said magnetic cores to its initial remanent state, and means for applying a current to said series circuit, said current being steered through one or more but less than all of said paths in each of said sets due to voltages induced in the paths of said certain cores when said certain cores are being changed from said other to said initial state, said means for applying said magnetizing force to said cores including a coil linking each of said cores for receiving said applied current.

17. A magnetic system comprising a plurality of magnetic elements each having two remanent states, a plurality of sets of current paths linked to certain of said elements in a desired combinatorial fashion, each said set including a plurality of current paths, said current paths of a set being in parallel with each other and said sets of current paths being connected to each other in a series circuit, a separate magnetic core and a separate rectifier element connected in each of said paths, each of said magnetic cores having two remanent states, means for changing certain ones of said magnetic cores from an initial remanent state to the other remanent state, means for applying a magnetizing force to said magnetic cores in a direction to change each of said magnetic cores to its initial remanent state, and means for applying a current to said series circuit, said current being steered through one or more but less than all of said paths in each of said sets due to voltages induced in the paths of said certain cores when said certain cores are being changed from said other to said initial state, said means for applying said magnetizing force to said magnetic cores including a coil linking each of said cores for receiving a current different from said applied current.

(References on following page)

References Cited in the file of this patent

UNITED STATES PATENTS

| | | |
|---|---|---|
| 2,691,152 | Stuart-Williams | Oct. 5, 1954 |
| 2,719,773 | Karnaugh | Oct. 4, 1955 |
| 2,719,961 | Karnaugh | Oct. 4, 1955 |
| 2,719,962 | Karnaugh | Oct. 4, 1955 |
| 2,729,807 | Paivinen | Jan. 3, 1956 |
| 2,733,860 | Rajchman | Feb. 7, 1956 |
| 2,734,183 | Rajchman | Feb. 7, 1956 |

OTHER REFERENCES

Articles entitled: "Static Magnetic Matrix Memory and Switching Circuits," by J. A. Rajchman, published in the RCA Review, vol. 13, June 1952, pages 183 to 201.

"Pulse-Switching Circuits Using Magnetic Cores," by M. Karnaugh, published in the "Proceedings of the IRE," May 1955 pp. 570 to 584.

UNITED STATES PATENT OFFICE

CERTIFICATE OF CORRECTION

Patent No. 2,851,678 September 9, 1958

Hewitt D. Crane

It is hereby certified that error appears in the printed specification of the above numbered patent requiring correction and that the said Letters Patent should read as corrected below.

Column 8, line 36, before "terminal" insert -- negative --; column 13, line 67, for "less than but all of" read -- but less than all of --.

Signed and sealed this 2nd day of December 1958.

(SEAL)
Attest:

KARL H. AXLINE
Attesting Officer

ROBERT C. WATSON
Commissioner of Patents